UNITED STATES PATENT OFFICE.

LOUIS C. GORIUS AND FRANKLIN B. HAYS, OF INDIANAPOLIS, INDIANA.

CLEANING COMPOUND.

1,322,009. Specification of Letters Patent. Patented Nov. 18, 1919.

No Drawing. Application filed June 7, 1915, Serial No. 32,553. Renewed April 25, 1919. Serial No. 292,695.

*To all whom it may concern:*

Be it known that we, LOUIS C. GORIUS, a citizen of the United States, residing at Indianapolis, Marion county, and State of Indiana, and FRANKLIN B. HAYS, a citizen of the United States, residing at Indianapolis, Marion county, and State of Indiana, have invented and discovered certain new and useful Improvements in Cleaning Compounds, of which the following is a specification.

Our invention relates to cleaning compounds and processes of producing same and its object is to produce a compound particularly advantageous for cleaning painted or varnished surfaces and also in one form thereof for cleaning the surfaces of tiles, marbles and similar material.

The compound generally stated consists of corn syrup, an alkali addition consisting preferably of caustic soda and soda ash in equal volumes of solids and water. The term "corn syrup" herein used is also known commercially as "glucose" and is a product derived from corn starch. In one form of the compound the same is particularly adapted for cleaning the surfaces of tiles, marbles, etc., and referring particularly to this form of the invention, the same is compounded by mixing 25% of water by weight with 48% of caustic soda and soda ash in equal volumes and 27% of corn syrup. These proportions may, of course, be somewhat varied. A lye the equivalent in saponifying effect of the water and the particularly named alkalis might be used. These substances are so mixed that a chemical reaction takes place and a precipitate is formed. This precipitate is then removed from the solution and the remaining solution constitutes a soapy liquid compound capable of effectually cleansing the surface of the materials above described. The precipitate is in the form of a jelly. This precipitate is then mixed with two parts by weight of water, whereupon the jelly will be dissolved in the water and the resulting compound will give a soapy cleansing composition substantially the same in properties as the first solution, although somewhat more effective in its cleansing action.

To provide a compound suitable for cleansing painted and varnished surfaces, 28% of water is mixed with 30% of caustic soda or caustic soda and soda ash in substantially equal parts, and 42% of corn syrup. This latter compound will effectually remove grease without injuring the paint or varnish and may be rinsed off freely.

The form of the compound first described, as compared with the usual compounds used for tile and marble work and similar material, cleans more quickly and is more soluble in water.

Having thus described our invention what we claim is:

1. A cleaning compound consisting of a chemically combined mixture of corn syrup, water and alkali material within substantially the following range of proportions by weight: 27% to 42% of corn syrup, 25% to 28% of water, and 48% to 30% of alkali material, the corn syrup being increased as the alkali is reduced.

2. A cleansing compound consisting of water, substantially 25% by weight, substantially 48% caustic soda and soda ash and 27% of corn syrup.

3. The process of forming a cleaning compound consisting in so mixing substantially 25% water by weight, substantially 48% caustic soda and soda ash in equal volumes, and substantially 27% corn syrup as to produce a chemical reaction, drawing off the solution and mixing the precipitate resulting from the chemical reaction in the mixture with substantially two parts by weight of water.

In witness whereof, we have hereunto set our hands and seals at Indianapolis, Indiana, this 4th day of June A. D., nineteen hundred and fifteen.

LOUIS C. GORIUS. [L. S.]
FRANKLIN B. HAYS. [L. S.]

Witnesses:
R. P. DOOLITTLE,
A. C. RICE.